2,748,107
Patented May 29, 1956

2,748,107
GLUCOSIDE AZO DYESTUFFS

Rudolph Hendrickson, Lake Alfred, and James W. Kesterson, Winter Haven, Fla., assignors to Research Corporation, a corporation of New York No Drawing. Application December 30, 1952,
Serial No. 328,828

3 Claims. (Cl. 260—144)

This invention relates to new azo dyestuffs and a method of making them.

It has been found that novel and useful dyestuffs may be produced by coupling the glucosides, naringin and hesperidin, in an alkaline medium with diazotized arylamines.

Naringin is the bitter glucoside of grapefruit and hesperidin can be extracted from several varieties of citrus fruits, for example, oranges.

Diazotizable arylamines of all types, such as aniline, sulfanilic acid, 2-amino-8-naphthol-6-sulfonic acid, 1-naphthylamino-4-sulfonic acid and 5-nitro-2-amino-anisole, may be diazotized and coupled with glucosides to produce useful dyestuffs.

The dyestuffs of the invention can be used for dyeing or printing various textile fibers. They are particularly useful for dyeing materials of animal origin, such as wool, silk, and leather. The dyestuffs may also be used as wood stains having exceptional fastness to light.

The new dyestuffs are particularly suitable for use in the usual chroming processes, such as top or bottom chroming, or the metallization may be effected in the dyebath by the single bath chroming process.

The following examples are illustrative of the method of the invention and of the new dyestuffs. The parts are by weight unless otherwise stated:

Example 1

9.3 parts of aniline are diazotized at 0–5° C. with 50 parts of water, 25 parts by volume of concentrated hydrochloric acid and 7.2 parts of sodium nitrite dissolved in 25 parts of water, with the addition of the requisite amount of ice. The diazo solution should be distinctly acid to Congo red and maintain a pronounced nitrite test for 10 minutes after the last nitrite addition. The diazo is then added in the course of one-half hour to an alkaline solution of 58 parts of naringin in 400 parts of water held between 5 to 10° C. by addition of ice. Sufficient alkali, either sodium carbonate or sodium hydroxide, is added to maintain the pH above 8.5 during the coupling reaction which is completed in less than one hour. The dye solution is partially neutralized and sufficient common salt added to precipitate the greater part of the dye which is filtered and dried. The dyestuff is a reddish-yellow powder which dissolves in water with a red-yellow coloration. It dyes wool from an acid bath yellow to orange and has excellent light-fast properties. After chroming gives an olive green shade.

Example 2

9.3 parts of aniline are diazotized at 0–5° C. with 50 parts of water, 25 parts by volume of concentrated hydrochloric acid, the requisite amount of ice and 7.2 parts of sodium nitrite which may be added over five minutes or longer if temperature considerations require it. The solution should be distinctly acid to Congo red paper and maintain a pronounced nitrite test for 10 minutes after the last nitrite addition. The diazo is then added in the course of one-half hour to an alkaline solution of 61 parts of hesperidin in 400 parts of water held between 5 to 10° C. by addition of ice. Sufficient alkali, either sodium carbonate or sodium hydroxide, is added to maintain the pH above 8.5 during the coupling reaction which is complete in less than one hour. The dye solution is partially neutralized and sufficient common salt added to precipitate the greater part of the dye which is filtered and dried. The dyestuff is a reddish-brown powder that dissolves in water to give an orange solution. It dyes wool a bright yellow with a very slight tint of red and has excellent light fastness. After chroming gives a light tan shade.

The colors on wool of the dyestuffs obtained with other typical diazotized arylamines are given in the following tables:

NARINGIN DYESTUFFS

| Arylamine | Color | After Chroming |
| --- | --- | --- |
| Sulfanilic acid | Yellow to orange | Yellowish olive-drab. |
| 1-Naphthylamine-4-sulfonic acid. | Pink to reddish-brown. | Tan. |
| 2-Amino-8-naphthol-4-sulfonic acid. | Bright, sl. bluish brown. | Brown. |
| p-Nitroaniline | Similar to aniline but redder. | Same. |

HESPERIDIN DYESTUFFS

| Arylamine | Color | After Chroming |
| --- | --- | --- |
| Sulfanilic acid | Yellow to orange | Yellowish olive-drab. |
| 1-Naphthylamine-4-sulfonic acid. | Orange | Light tan. |
| 2-Amino-8-naphthol-4-sulfonic acid. | Brown | Tan. |
| 5-Nitro-2-amino-anisole | Tan | Orange. |

We claim:

1. Monoazo dyestuffs comprising the products obtained by coupling in an alkaline medium a diazotized arylmonoamine containing not more than two aryl rings and a glucoside of the group consisting of naringin and hesperidin.

2. Monoazo dyestuffs comprising the products obtained by coupling in an alkaline medium a diazotized arylmonoamine containing not more than two aryl rings and naringin.

3. Monoazo dyestuffs comprising the products obtained by coupling in an alkaline medium a diazotized arylmonoamine containing not more than two aryl rings and hesperidin.

References Cited in the file of this patent

Fierz-David: Processes of Dye Chemistry, 1949, pgs. 430–433, 442, 443, 448–51.